Oct. 15, 1935.  C. E. JOHNSON  2,017,312
PISTON SPREADER
Filed March 18, 1935
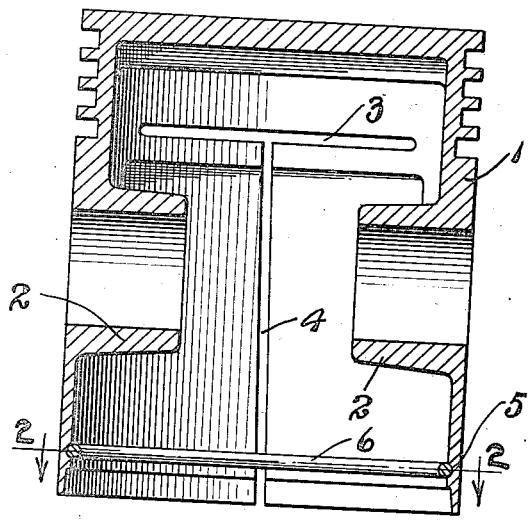
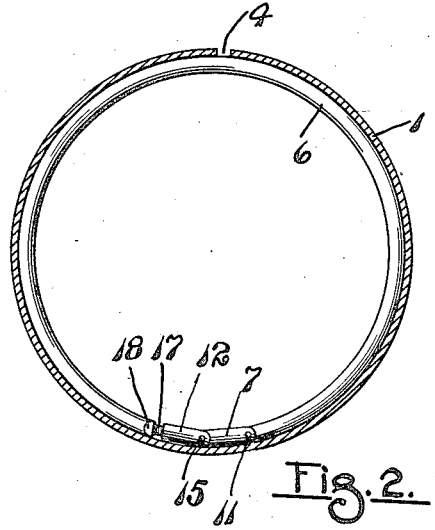
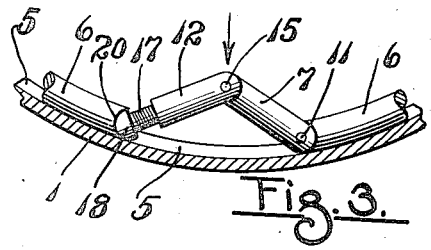
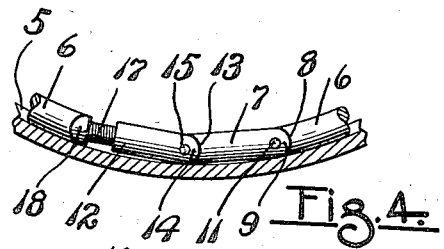
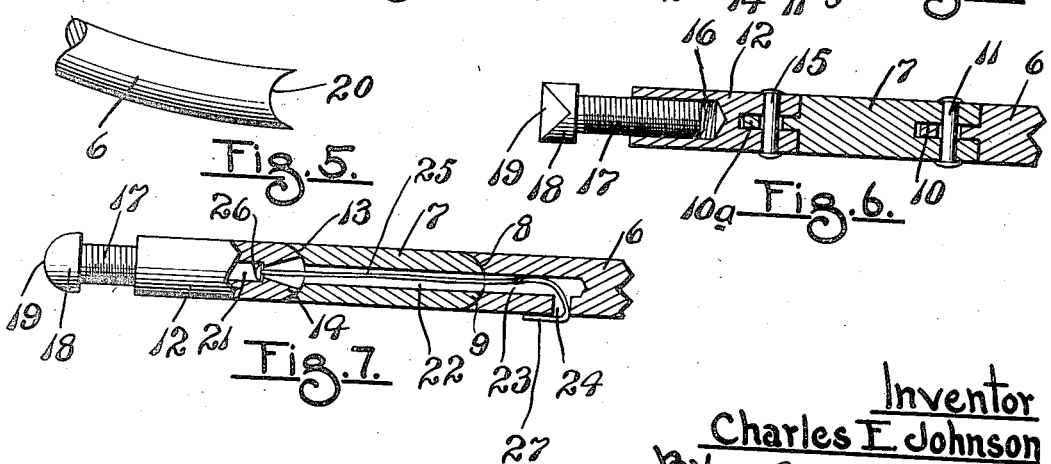
Inventor
Charles E. Johnson
By Liverance and
Van Antwerp
Attorneys Patented Oct. 15, 1935

2,017,312

UNITED STATES PATENT OFFICE 2,017,312

PISTON SPREADER

Charles E. Johnson, North Muskegon, Mich.

Application March 18, 1935, Serial No. 11,557

9 Claims. (Cl. 309—12)

This invention relates to a piston spreader.

Pistons which are made of an aluminum alloy are desirable for many reasons, particularly because of their light weight. Such pistons, however, do not expand and contract with the engine block or cylinders, which are of cast iron and in which the coefficient of expansion is not more than approximately one-half that of the aluminum or aluminum alloy pistons. The upper end of an aluminum piston is properly held in the cylinder in which it operates because of the several piston rings which surround the upper end of the piston in spaced apart relation to each other. The skirt of the piston is the part which is either slightly too small when the engine is cold or becomes expanded to slightly too large a size when the engine is hot, there being no intermediate guiding or bearing means, such as the piston rings which, in addition to their oil saving and compression holding qualtities, hold and guide and stabilize at the upper end of the piston.

With my invention it is designed that the skirt or lower portion of the piston shall be vertically slotted at one side to permit a contraction of the piston or its enlargement or expansion when desired, associated with which at the lower end portion and at the inner side of the piston ring skirt the spreader or expander of my invention is installed.

It is a primary object and purpose of the present invention to provide a very simple and economically made yet practical and effective piston spreader and one which may be readily adjusted to the piston which it is to serve, or by replacement of one part therein, may be used in pistons of different sizes. These and many other objects and purposes than those enumerated will appear from an understanding of the invention had from the following description taken in connection with the accompanying drawing, in which, Fig. 1 is a vertical section through a piston equipped with the piston spreader of my invention.

Fig. 2 is a horizontal section substantially on the plane of line 2—2 of Fig. 1 and looking downwardly.

Fig. 3 is a fragmentary somewhat enlarged horizontal section illustrating the manner in which the spreader is first applied.

Fig. 4 is a similar section showing the spreader extended by moving the toggle link construction from the position shown in Fig. 3 to that shown in Fig. 4.

Fig. 5 is a fragmentary enlarged elevation of one end of the largest member of the spreader.

Fig. 6 is a fragmentary enlarged central longitudinal section of the one end of the spreader showing the manner of pivotally connecting the various parts thereof, and Fig. 7 is a view somewhat similar to Fig. 6 showing a different form of connection for the parts or elements of the spreader.

Like reference characters refer to like parts in the different figures of the drawing.

The piston 1, of an aluminum character, has wrist pin bosses 2 between the upper and lower ends of the piston and extending inwardly toward each other. In the piston shown there is a horizontal slot 3 at one side of the piston in a plane adjacent the lowermost piston ring groove and a substantially vertical slot 4 extends from approximately midway between the ends of the slot 3 to the lower edge of the piston skirt. At the inner side of the piston skirt and near its lower end a continuous groove 5 of concave formation is provided in which the spreader of my invention is installed.

The piston spreader of my invention comprises as its largest member a curved wire ring member 6 of circular or substantially circular form. Ring 6 is parted at one side and the ends thereof are spaced a distance apart. At one end of the member 6 one link 7 of a toggle lever construction is pivotally connected. The adjacent end of the ring member 6 is formed with a concaved seat or socket 8 and one end of the link 7 is formed with a convex end 9 to seat in said socket 8. A tongue 10 extends from the adjacent end of the member 6 into a slot at the end of the link 7 and a pin 11 passes through the end of the link 7 and said tongue thereby pivotally connecting the same together whereby the link 7 may turn about the axis of the pin 11. A second toggle link 12 is pivotally connected to the opposite end of the toggle link 7. At the adjacent ends of the members 7 and 12 a like concaved recess or socket 13 is formed in the link 7 and link 12 is formed with a convexly curved head 14. A tongue 10a extends from the link 7 into a slot in the link 12 (Fig. 6) and the parts are pivotally connected by a pivot pin 15 the same as the members 6 and 7 are pivotally connected by the pins 11.

The free end of the toggle link or member 12 is interiorly bored and threaded as shown at 16. A threaded shank 17 having a head 18, may be screwed into the interiorly threaded hole or opening 16. The head 18 is rounded at its outer side to make a convex surface 19 and the other end of the curved ring member 6 is formed with a concaved recess or socket 20 in which the head 19 may be seated.

A piston spreader as constructed may be located in the groove 5 with the head 18 seated in the socket 20 and with two toggle link members 7 and 12 positioned as shown in Fig. 3 with the knee or knuckle of the toggle lever construction positioned inwardly a distance from the groove 5. Then by using a pair of pliers, one jaw engaging the outer side of the piston skirt and the other bearing against the knee or knuckle of the toggle construction it is straightened out and the pivot at 15 passed across dead center to the position shown in Fig. 4, thereby spreading the ends of the member 6 apart and thus firmly and snugly engaging the spreader within the groove 5 of the piston skirt and holding the same spread apart as is evident. By adjusting the shank 17 of the screw within the threaded opening 16 the extent of spread is controlled.

This construction of piston spreader is easy to manufacture and is particularly easy to install in place. It does not interfere in any way with the connecting rod attached at one end to the wrist pin of the piston and at the other end to the engine crank shaft. Because the pivotal axis at 15 passes across the dead center line extending between the axes of turning of the head 18 and of the end 9 of the link 7, the spreader is firmly held in place and will not accidentally disengage from the piston during its service in an engine.

In Fig. 7 another manner of connecting the parts 6, 7 and 12 together is shown. Instead of using the tongues 10, 10a and the pins 11 and 15, the link 12 is bored axially from the inner end of the threaded opening at 16 as shown at 21. Link 7 is provided with a longitudinal opening 22 through its entire length and the adjacent end of the member 6 has an axial opening 23 for a short distance, from which a lateral opening 24 extends to the outside. A wire 25, having a head 26, may be passed through the several openings, the head 26 coming against a shoulder at the bottom of the opening 21, and the end of the wire being pased through the passages 24 and bent over as shown at 27 in Fig. 7. This holds the parts 6, 7 and 12 together. There is no strain upon the connecting means used, either pivot pins such as 11 and 15 or the flexible wire such as shown at 25. The bearing of the rounded or convexed heads 14 and 9 in the sockets 13 and 8 takes care of all the pressure forces that are set up in installing the spreader in a piston.

It is evident that by using a longer head 18 the spreader may be used in connection with pistons of larger diameter. All that is necessary to replace is the headed screw shown with one having a longer head 18.

The invention is very practical and serviceable and has so proved in tests and trials thereof. The claims appended hereto define the invention which is to be considered comprehensive of all forms of structure coming within the scope of said claims.

I claim:

1. In combination with a piston having an annular groove at the inner side and near the lower end thereof, said piston being vertically slotted for permitting spreading at its lower end portion, of a spreader comprising a divided ring member adapted to seat in said groove and bodily movable extensible means bearing against one end of the ring member and also adapted to bear against the other end thereof, said means being movable into said groove to thereby spread the ends of said ring member apart and engage against and diametrically spread the lower end portion of said piston, the sides of the grooves holding the said means against movement axially of the piston when the ring member is spread.

2. In combination, a piston vertically slotted from its lower end upwardly for a distance at one side and having an annular groove at its inner side near its lower end, a spreader located in said groove comprising a divided ring member, and a toggle lever construction pivotally connected at one end to one end of the ring member and bearing at its other end against the other end of said ring member, said toggle lever construction being operable to a position substantially in line with the curve of said ring member and into said groove, to thereby move the ends of said ring member farther apart, as and for the purposes specified.

3. A spreader for pistons comprising a divided ring member, the ends thereof being spaced a distance apart, a toggle lever structure comprising two links pivoted together at adjacent ends, the other end of one of said links having a pivotal connection to one end of the ring member, and the other of said links having a free end adapted to engage against the opposite end of the ring member.

4. A spreader for pistons comprising, a divided substantially circular ring member, the ends thereof being spaced apart, a toggle lever construction comprising two links pivoted together at adjacent ends, one link thereof at its other end having a pivotal connection to one end of the ring member, and a member adjustable lengthwise of and mounted at the free end of the other link member adapted to bear against the other end of said ring member, as and for the purposes described.

5. A spreader for pistons comprising, a substantially circular ring member divided at one side and having its ends spaced a distance apart, a toggle lever construction comprising two links pivotally connected together, one of said links having a pivotal connection to one end of the ring member, the other of said links having a free end adapted to bear against the other end of the ring member, and means for adjusting the length of the toggle lever construction.

6. A spreader for pistons comprising, a substantially circular ring member parted at one side with ends spaced apart, each of said ends of the ring member having a curved seat therein, a toggle lever construction comprising two links pivotally connected together, one of said links at one end having a curved end to fit in the seat at one end of the ring member, and means for pivotally connecting said link to said ring member at said end thereof, the free end of the other link having a curved head adapted to be received in the seat at the other end of said ring member.

7. A construction containing the elements in combination defined in claim 6, said links of the toggle lever construction at their adjacent pivotally connected ends being formed, one with a curved seat therein and the other with a curved head received in said seat, as specified.

8. In a piston spreader, a substantially circular ring member parted at one side and with the ends thereof spaced apart, a toggle lever construction comprising two links pivotally joined together, one of said links having a pivotal connection to one end of the ring member, the other of said links at its free end having an interiorly threaded longitudinal opening therein, and a screw adjustably threaded into said opening and provided with a head at its outer end adapted to bear against the other end of said ring member.

9. A piston spreader comprising, a substantially circular ring member divided at one side with the ends spaced apart, and a toggle lever construction comprising two links pivotally associated and having the farther ends of said links bearing against the ends of said ring member to thereby spread the same apart on straightening the toggle lever construction.

CHARLES E. JOHNSON.